US005996873A

United States Patent [19]

Pimpis

[11] Patent Number: 5,996,873

[45] Date of Patent: Dec. 7, 1999

[54] DEVICE FOR THREADING A WEB OF MATERIAL THROUGH A ROTARY PRINTING PRESS

[75] Inventor: Robert Michael Pimpis, Dover, N.H.

[73] Assignee: Heidelberger Druckmaschinen AG, Heidelberg, Germany

[21] Appl. No.: 09/075,655

[22] Filed: May 11, 1998

[51] Int. Cl.[6] .............................. G03B 1/56; B41F 13/54

[52] U.S. Cl. .............................................. 226/92; 101/228

[58] Field of Search ............................ 226/92; 238/10 R, 238/10 A, 10 E, 10 F; 101/228; 198/750.1, 867.14, 841

[56] References Cited

U.S. PATENT DOCUMENTS

| | | | |
|---|---|---|---|
| 4,496,100 | 1/1985 | Schwager et al. | 238/10 R |
| 4,646,636 | 3/1987 | Gertsch | 226/92 X |
| 4,706,862 | 11/1987 | Theilacker . | |
| 5,085,148 | 2/1992 | Konno | 238/10 R |
| 5,226,524 | 7/1993 | Guttinger et al. | 198/867.14 X |
| 5,263,414 | 11/1993 | Lehrrieder et al. | 226/92 X |
| 5,400,940 | 3/1995 | Sato et al. . | |
| 5,779,145 | 7/1998 | Zelle et al. | 238/10 E |

FOREIGN PATENT DOCUMENTS

| | | |
|---|---|---|
| 0 521 828 | 5/1995 | European Pat. Off. . |
| 0 526 391 | 5/1995 | European Pat. Off. . |

*Primary Examiner*—Michael R. Mansen
*Attorney, Agent, or Firm*—Kenyon & Kenyon

[57] ABSTRACT

A device for threading a web through a printing press has a track and a snake riding externally on the track. The snake includes a plurality of segments which interconnect using holes and bosses. The track may comprise a plurality of curved and straight section to permit the snake to access various parts of the printing press.

20 Claims, 8 Drawing Sheets

DEVICE FOR THREADING A WEB OF MATERIAL THROUGH A ROTARY PRINTING PRESS

FIELD OF THE INVENTION

The present invention relates to a device and method for threading a web of material through a rotary printing press.

RELATED TECHNOLOGY

Web printing presses typically require that a roll of paper be unwound during start-up and fed through the printing press. As a printing press may contain several complex sections, this feeding or threading of the web can be rather complicated.

U.S. Pat. Nos. 4 702,862 and 5,400,940 disclose devices for threading a paper web through a rotary printing press. As shown in FIGS. 3 and 4 of the '862 patent connecting or holding elements are coupled to a cable extending through a slit in a guide tube. The holding elements connect to a triangular portion of the web from the side and pull the web so as to thread the web through the printing press. In the '940 patent a guiding member runs along a guide path and has a engaging portion adapted to engage or secure a guided end of a paper web.

European Patent Nos. 0 526 391 and 0 521 828 show devices for feeding fabric webs into a rotary printing press has a drive consisting of a plurality of links which have guide pulleys running in a guide groove of a guide rail.

Known feeding devices have several disadvantages, including difficulties in fabricating track components, especially at radial sections and at transition zones. With track devices friction caused by the contact of the web driver or snake often results in high drive power requirements and component wear. Moreover, reduced web path flexibility often occurs due to limitations in the bend radius of the snake. When the snake is contained within the track, access to the snake and to drive components in the event of a system failure is limited. Drive mechanisms relying on frictional contact with the snake also are prone to malfunction due to a loss of adhesion when components are contaminated by fluids and/or particulates.

Continuous belt or snake constructions require disassembly and replacement of the entire length of the snake in the event of malfunction, which can be costly and time-consuming.

Moreover material limitations of the threading apparatus may preclude use of the apparatus for threading the web through ovens or dryers.

SUMMARY OF THE INVENTION

The present invention provides a device for threading a web through a printing press comprising a snake and a track for supporting the snake, the snake including a plurality of individual segments which are joined using bosses retained by holes to form the snake. The snake runs externally on the track. The individual components are thus mechanically simple and may be easily manufactured for example using injection molding. This allows for a snap together design while insuring high component part repeatability. The segments can allow for freedom to rotate along the track path so that the snake can follow a helical path which may be required to lead the web through angle bars or other parts of the printing press.

The track advantageously may comprise a bar preferably rectangular in cross section and may be made of metal ceramic or a polymer. The track can be coated with a material to reduce friction, and can use a principle of guidance similar to that of a monorail system. The snake wraps around and is retained by the track, so that the track constrains the snake to translation in the track path direction.

To minimize contamination on the track, the leading and trailing segments of the snake may incorporate scraper blades to remove contaminants. The scraper blades may be made of a softer material than the track surface so as to minimize track wear, and may be either rigid or pliable. The scraper blades may be removable for easy replacement.

The snake is driven by a powered device. This device can include pinch rolls either a single roll on one side or two opposing rolls. These rolls can act along the sides of the segments or one or more of the segments can be powered segments having a roll or rolls acting along the bottom of the track. Alternatively gears, pulleys or a belt can run alongside the track, so that a protrusion or cut-out of the gear pulley or belt interacts and mates with a corresponding cut-out or protrusion of at least one of the individual segments of the snake. Preferably at least two gears pulleys or belts interact with the snake at all times in order to share loading and minimize stresses.

At least one of the segments advantageously the leading or the trailing segments provides for attachment of the web to the snake. Preferably, a polymer sheet triangular in shape is provided between the snake and the web. The sheet may attach to the entire front of the web using tape or other known means and attach to the segment or segments through an arm fastened to one of the segments or through clips or other known means. The triangular sheet acts as a transition piece to maintain web alignment and to minimize stresses on the web during translation. The snake is located on one side at an edge of the web, preferably on the gear side of the press.

The track can be provided with separate paths so that the path of the snake can switch depending on the desired feed path of the web. The present invention thus can further comprise a diverting mechanism for diverting the snake between different paths of the track. The diverter mechanism may comprise a switching device which translates or rotates a section of track.

The track may be comprised of individual sections, which may be either straight or curved. In straight-to-straight connections of the sections, the track section are joined by a flat joiner less than the track width and less than the track thickness. An open underside of the snake segments allows the joinder to protrude beyond the track surface. The ends of the section to be joined are slotted to accept the joiner which can slide into the slots. The joiner is retained by fasteners threaded into the connected track sections In straight-to-curved or curved-to-curved connections of track sections, a flat joiner may not be advantageous to use. Thus, for track section connections in which a curved section is present a groove (machined molded or cast) may be located at the end of the section for example having a dovetail or circular cross section. A matching keeper piece matches the profile formed in the track by the two connected sections and may be for example have a butterfly or dog-bone shape, and be made of metal or polymer by castings machining stamping or molding. The keeper piece fits into or is pressed into the grooves to provide sufficient structural integrity. Advantageously the track can then be easily disassembled at the keeper piece locations without any backward or forward translation of the track itself being necessary.

The track may be mounted at different locations on a mount. The mounting of the track provides for simplicity and flexibility, as the track is fastened at its underside to the mount using standard fasteners. The mount advantageously thus can be oriented in different ways when attached to the press frame or base plate. The mount may be a machined or cast component and may be designed to allow for various degrees of freedom, which are fixed when the track is mounted.

BRIEF DESCRIPTION OF THE DRAWINGS

In the following the present invention is explained in more detail with the aid of the drawings in which.

DETAILED DESCRIPTION

Figure 1:
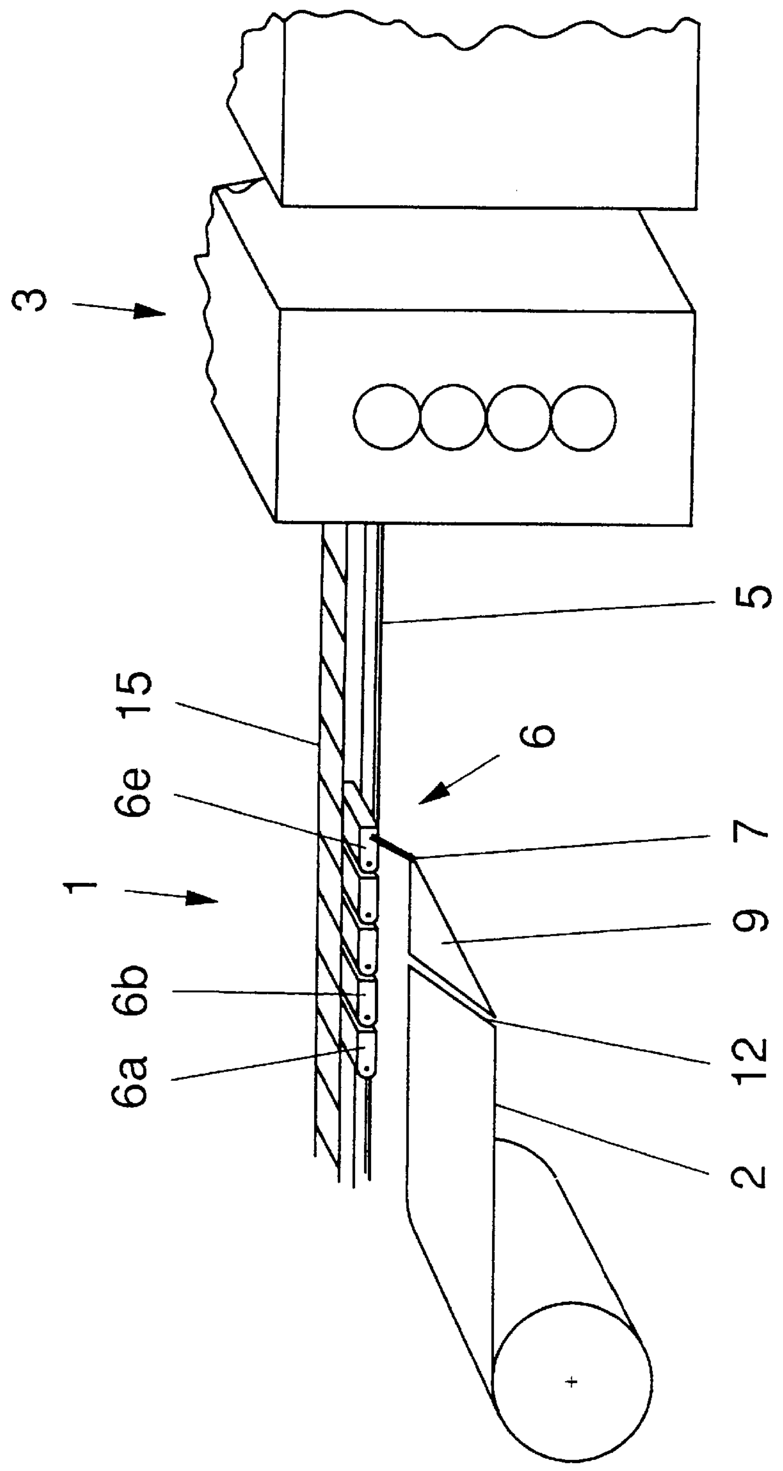
FIG. 1 shows a general view of the device of the present invention.
Figure 1A:
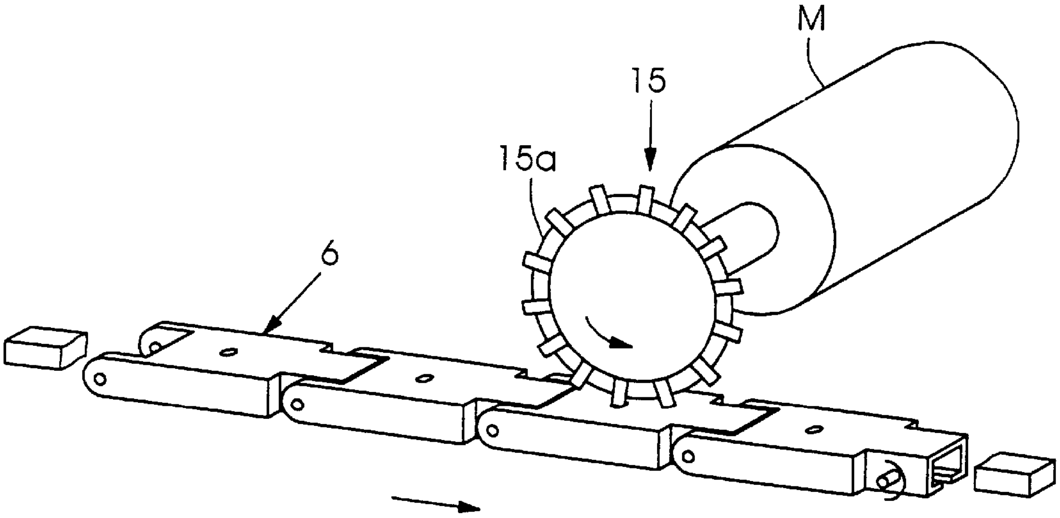
FIG. 1A, 1B and 1C show power devices for powering the device of the present invention.
Figure 1B:
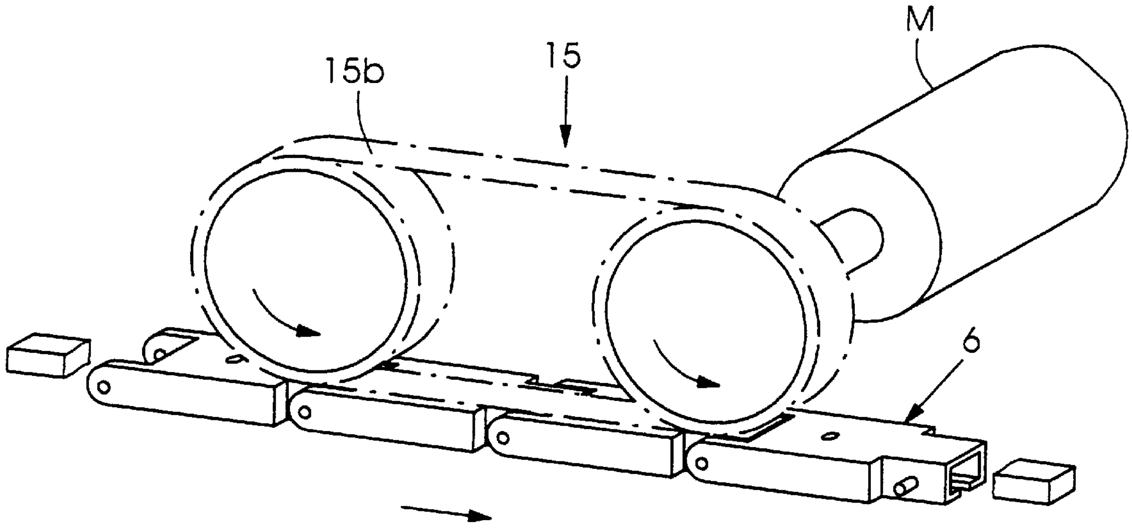
Figure 1C:
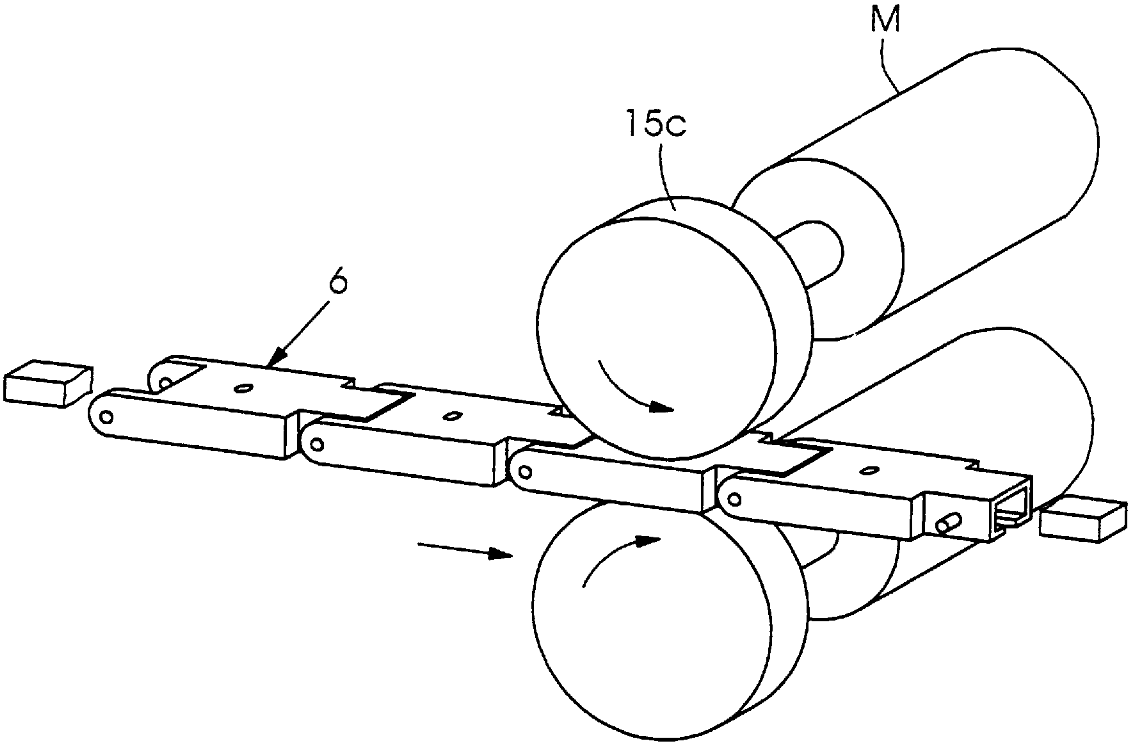

FIG. 1 shows a device for threading a web of material 2 through a printing press 3 shown here schematically. The device 1 comprises a track 5 on which runs a snake 6. Snake 6 includes a plurality of individual segments 6*a*, 6*b*, etc. The lead segment 6*c* has a bar 7. The bar 7 is connected to a triangle 9, preferably made of a polymer. It should be noted that the snake 6 may connect to the side of the triangle 9 in a number of locations to provide additional or alternative support, and may be connected through bars or clips in known fashion. The triangle 9 is fastened at another side to a lead edge 12 of the web 2, through tape or other known means. It should be noted that the web and other portions in FIG. 1 are not drawn to scale so that the device 1 for threading can be more clearly depicted. Beside the track 5 is a power device 15 shown schematically, for propelling the snake 6. The power device 15 can comprise a series of pulley gears or a belt, which interact with one or more side of the snake 6 to move the snake 6 over the track 5. There are a plurality of power devices 15 along the path of the snake. FIGS. 1A, 1B and 1C show three versions of the power devices 15 located along the path of the snake. In FIG. 1A, a gear wheel 15A interacts with the top side of the snake and is driven by motor M, while in FIG. 1B a belt 15B interacts with the top of the snake, one of the wheels of the belt being driven by a motor M. In FIG. 1C, a pinch wheel 15C is driven by a motor M, so that no gears or other raised sections are necessary on the snake segments. An idler wheel alternatively may be located below the pinch wheel.

Figure 2:
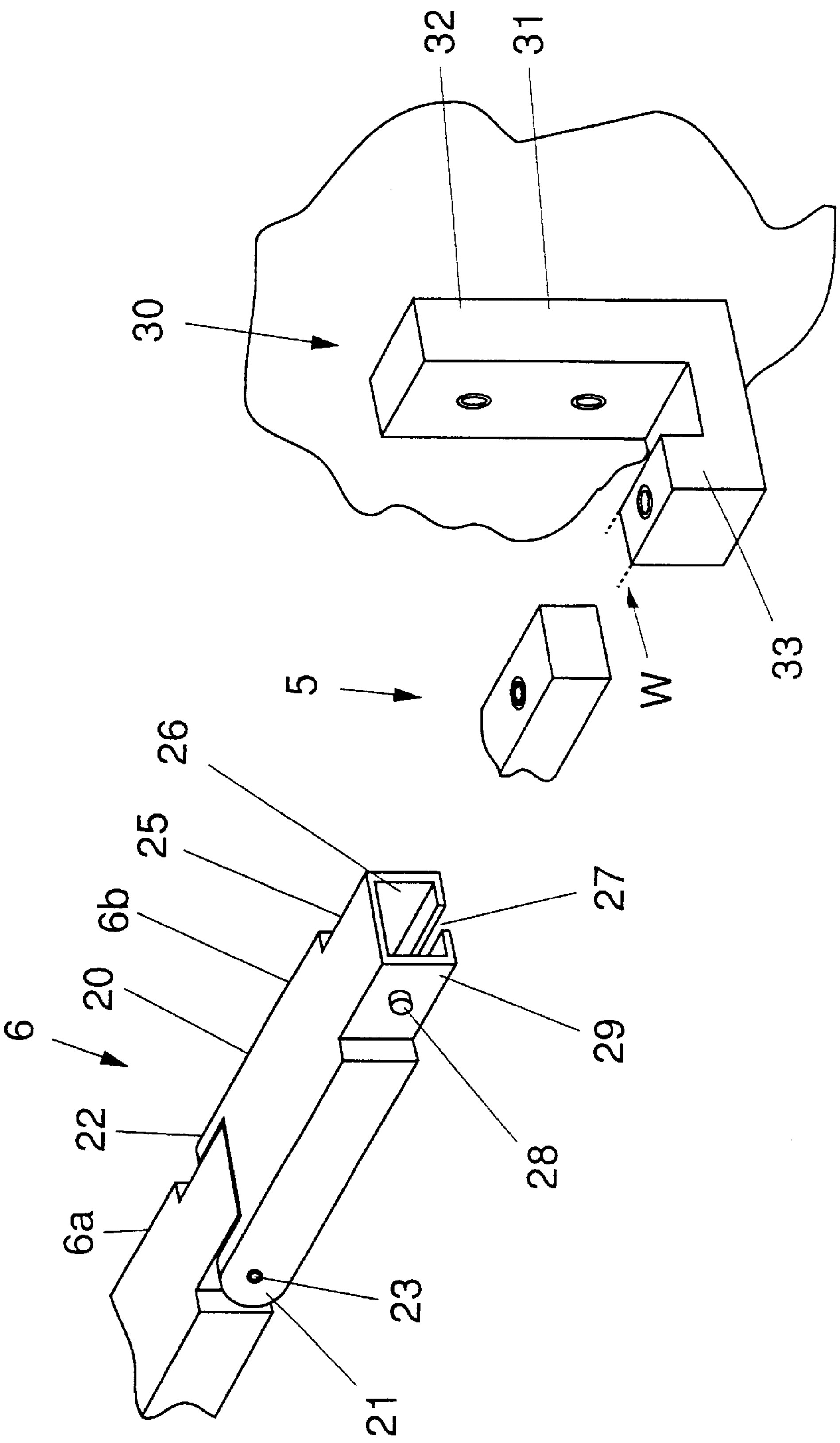
FIG. 2 shows simplified view in more detail of the device of the present invention.
Figure 2A:
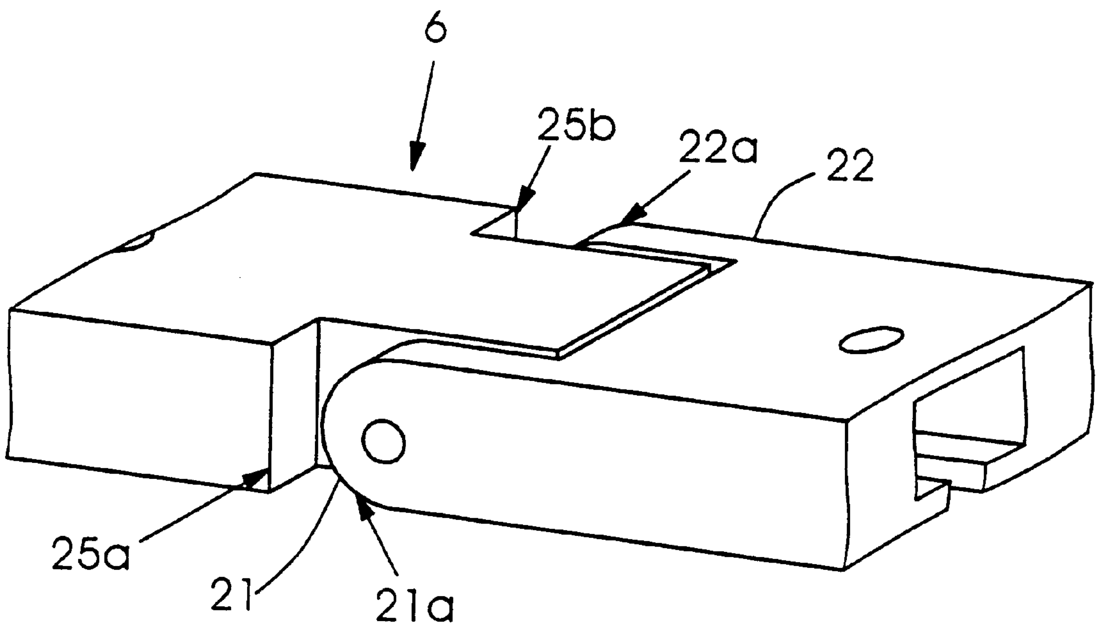
FIG. 2A shows an exploded view of an alternative embodiment of a connection between two snake segments.

FIG. 2 shows the snake 6 and track 5 in simplified form. The individual segments of the snake 6 including segments 6*a* and 6*b* can seen. Each individual segment includes a main body 20 having a forward and rear end. Two arms 21 and 22 extend from the rear end. A hole 23 which as defined herein may include a bore or solely an internal depression is provided in each of the rear arms. Connected to the front end of the main body 20 is a forward extension 25. Within both main body 20 and forward extension 25 is an internal opening 26, preferably of a rectangular shape. The internal opening 26 is not bounded at the bottom so that a slot 27 is formed at the bottom. The forward extension 25 also has two bosses or knobs 28 on outer side walls 29 of the forward extension 25. The bosses 28 can interact with a hole of another segment, similarly to the bosses of segment 6*a* shown interacting with the holes 23 of segment 6*b*. The bosses are a bearing surface with the holes. Depending on the materials used, the bosses may be smaller than the depressions so that some freedom of movement is permitted during turning of the snake. Alternatively, as shown in FIG. 2A rear surfaces 21A and 22A of arms 21 and 22 bear against surfaces 25A and 25B to provide for reduced stresses and friction.

The snake 6 runs on the track 5, so that the track 5 fits in the internal opening 26 of the individual segments. The outer dimensions of the track 5 can be less than the dimensions of internal opening 26, so that limited sideways and up and down movement is permitted, as in known monorail systems.

The track 5 can be mounted through a mount 30, which can include a plurality of individual mounting pieces 31, which can be connected to a base plate 35 or a frame of the printing press. The mounting piece 31 has a J-shaped form including a main section 32 and an end leg 33. The track 5 may be mounted by screws or in other known manner to the end leg 33. The end leg 33 has a width W which is less than the width of the slot 27 of the snake 6.

Figure 3:
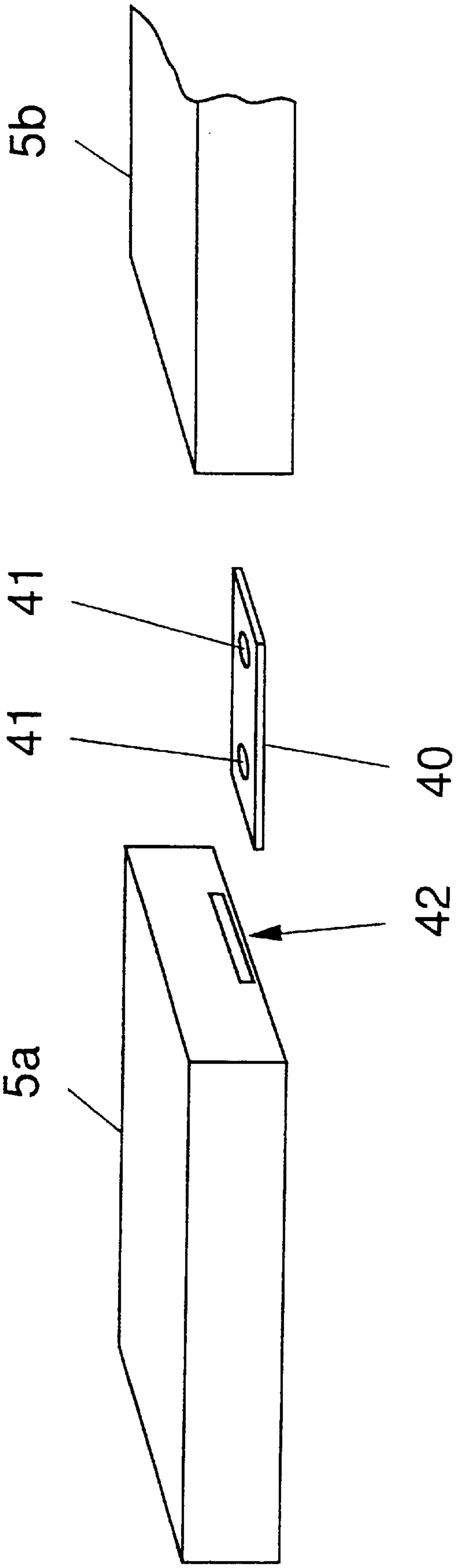
FIG. 3 shows a straight-to-straight track segment connection.
Figure 4:
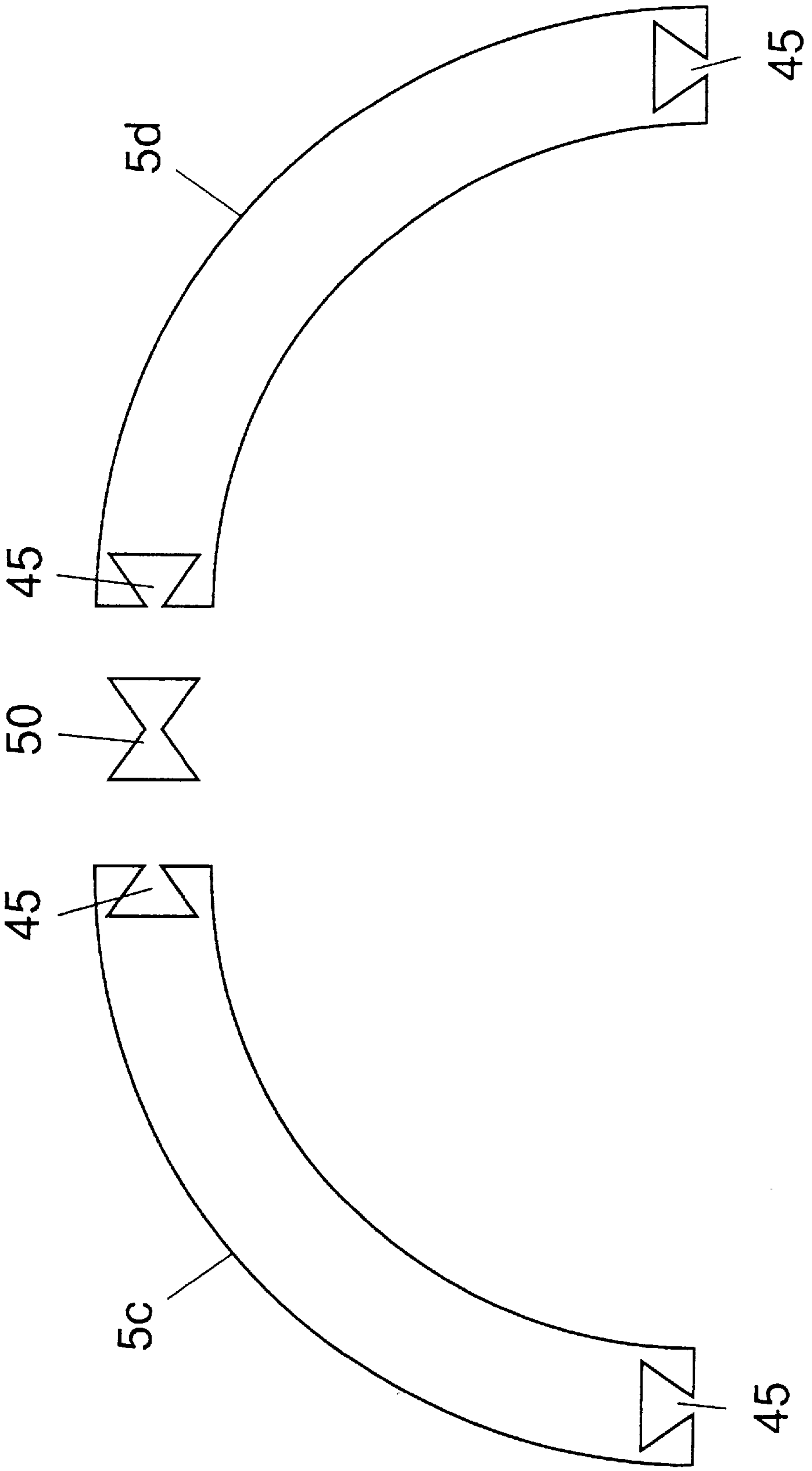
FIG. 4 shows a curved-to-curved track segment connection.

The track 5 advantageously can be made of a plurality of track sections. As shown in FIG. 3 a straight-to-straight connection of sections 5*a* and 5*b* is shown. A flat joiner 40 can fit into a slot 42 in the end of the track sections 5*a* and 5*b*. The joiner 40 is retained by fasteners threaded into the connected track sections through holes 41. As shown in FIG. 4, which is a bottom view of the track 5, track sections 5*c* and 5*d* are curved. In these sections grooves 45 are located at the end of the sections 5*c* and 5*d*, the grooves 45 having a dovetail cross section. A matching keeper piece 50 matches the profile formed in the track by the two connected sections and has a butterfly shape. The grooves 45 may extend through the entire depth of the track 5. The keeper piece 50 fits into or is pressed into the grooves 45, and may be flush with the track to prevent protrusion. The keeper piece 50 may be shorter in length than the track width. Advantageously, the track can then be easily disassembled at the keeper piece locations without any backboard or forward translation of the track itself being necessary.

What is claimed:

1. A device for threading a web through a printing press comprising:

a track; and a snake riding externally on the track, the snake including a first segment and a second segment, the first segment having at least two holes and the second segment having at least two bosses for interacting with the at least two holes.

2. The device as recited in claim 1 wherein the first segment is an injection molded segment.

3. The device as recited in claim 1 wherein the snake has an internal opening interacting with the track.

4. The device as recited in claim 1 wherein the first segment has a first and a second arm, a first of the at least two holes being located in the first arm and a second of the at least two holes being located in the second arm.

5. The device as recited in claim 1 wherein the second segment has an extension having outer side surfaces, the at least one boss being located on the outer side surfaces.

6. The device as recited in claim 1 further comprising a driving device for driving the snake.

7. The device as recited in claim 1 further comprising a triangle attached to the snake and the web.

8. The device as recited in claim 1 wherein the triangle is made of polymer.

9. The device as recited in claim 1 wherein the track includes a plurality of track sections.

10. The device as recited in claim 9 wherein track sections include a straight section having a slot and the track further includes a flat joiner.

11. The device as recited in claim 9 wherein track sections include a curved section having a groove and the track further includes a keeper piece.

12. A device for threading a web through a printing press comprising:

a track; and a snake riding externally on the track, the snake including a first segment and a second segment the first segment having a first arm having a first hole and a second arm having a second hole, the second segment having and extension with a first outer side surface having a first boss and a second outer side surface having a second boss, the first boss interacting with the first hole and the second boss with the second hole, the second segment having an internal opening through the extension for interacting with the track.

13. The device as recited in claim 12 wherein the second segment is an integral one-piece segment.

14. The device as recited in claim 12 further comprising an external driving device for driving the snake.

15. The device as recited in claim 12 further comprising a triangle attached to the snake and the web.

16. A device for threading a web through a printing press comprising a track having a plurality of track sections; and a snake riding externally on the track, the snake including a first segment and a second segment;

the first segment having a first arm having a first hole and a second arm having a second hole, the second segment having an extension with a first outer side surface having a first boss and a second outer side surface having a second boss, the first boss interacting with the first hole and the second boss with the second hole.

17. The device as recited in claim 16 wherein track sections include a straight section having a slot and the track further includes a flat joiner.

18. The device as recited in claim 16 wherein track sections include a curved section having groove and the track further includes a keeper piece.

19. The device as recited in claim 16 further comprising a J-shaped mounting piece connected to the track.

20. The device as recited in claim 16 wherein the second segment is an integral one-piece segment.

* * * * *